(12) United States Patent
Smith (10) Patent No.: US 6,550,640 B2
(45) Date of Patent: Apr. 22, 2003

(54) METHOD AND APPARATUS FOR CONTROLLABLY DISPENSING POWDERS AND LIQUIDS

(76) Inventor: William G. Smith, 3419 Deluna Dr., Rancho Palos Verdes, CA (US) 90275

( * ) Notice: Subject to any disclaimer, the term of this patent is extended or adjusted under 35 U.S.C. 154(b) by 0 days.

(21) Appl. No.: 09/803,852

(22) Filed: Mar. 12, 2001

(65) Prior Publication Data

US 2002/0125275 A1 Sep. 12, 2002

(51) Int. Cl.[7] .................................................. G01F 11/00
(52) U.S. Cl. .................... 222/1; 222/142.9; 222/370; 222/427; 222/430; 222/450
(58) Field of Search ....................... 222/1, 142.7, 142.9, 222/305, 370, 426, 427, 430, 444, 450

(56) References Cited

U.S. PATENT DOCUMENTS

| | | | | |
|---|---|---|---|---|
| 1,944,447 A | * | 1/1934 | McVicker | ................ 222/450 |
| 2,515,735 A | | 7/1950 | Saunders | |
| 2,898,010 A | | 8/1959 | Tepper | |
| 3,269,612 A | | 8/1966 | Bode | |
| 3,308,995 A | | 3/1967 | Lee et al. | |
| 3,402,847 A | | 9/1968 | Bridenstine | |
| 3,695,487 A | | 10/1972 | Slayton et al. | |
| 3,917,129 A | | 11/1975 | Cavazza | |
| 4,164,301 A | | 8/1979 | Thayer | |
| 4,572,376 A | | 2/1986 | Wrennall | |
| 4,674,660 A | * | 6/1987 | Botto | ................ 222/181.3 |
| 4,832,235 A | | 5/1989 | Palmer | |
| 5,123,574 A | | 6/1992 | Poulos | |
| 5,211,301 A | | 5/1993 | Groya | |
| 5,271,535 A | | 12/1993 | Fridman et al. | |
| 5,520,307 A | | 5/1996 | Miller et al. | |
| 5,588,550 A | | 12/1996 | Meyer | |
| 5,685,351 A | | 11/1997 | Kazarian et al. | |
| 6,283,339 B1 | * | 9/2001 | Morrow | ................ 222/142.9 |

FOREIGN PATENT DOCUMENTS

EP          0269580          6/1988

* cited by examiner

Primary Examiner—Joseph A. Kaufman
(74) Attorney, Agent, or Firm—Stetina Brunda Garred & Brucker (57) ABSTRACT

A container top includes rotatable elements that are used to dispense matter from the container. The top includes a drum with chambers of varying volumes, and a rotatable disc on opposing ends of the drum to allow material to flow into and out of selected chambers of the drum. A spout is rotatably connected to one end of the drum with one disc connected to rotate with the spout, and a cap is rotatably connected to an opposing end of the drum. The drum and spout are rotated to control the filling of the chambers and the emptying of selected chambers. Latches extend between the parts to hold them together while allowing the rotation. Resilient rings are interposed between the drum and mating parts to allow resilient sealing of the chambers during rotation.

23 Claims, 3 Drawing Sheets

METHOD AND APPARATUS FOR CONTROLLABLY DISPENSING POWDERS AND LIQUIDS

BACKGROUND OF THE INVENTION

1. Field of the Invention

The present invention related to the field of container closures. Particularly, the present invention relates to powder or liquid dispensing container closures.

2. Description of the Related Art

Containers are used to hold matter such as liquids and powders. Liquid containers generally include a container body and a cap. The liquid within the container is dispensed when the container is inverted while the cap is not in place. The amount of dispensed liquid is controlled by maneuvering the container between horizontal and vertical orientations. When an exact amount of liquid is desired, a measuring tool is generally employed because there is usually no reliable way of knowing how much liquid is being dispensed from the container. The measuring tool may include markings that are indicative of the level of liquids in the container. The measuring tool may also be of a known capacity such that the amount of liquid filled in the container, to capacity, is also known. To dispense the desired amount of liquid, the liquid is poured from the liquid container to the measuring tool. The liquid in the measuring tool can then be used for the desired purpose.

Powder containers generally include a container body and a top. The top sometimes includes several openings of varying dimensions, each having a separate closure. The size of the opening is generally used to control the rate of powder dispensing. The size of the opening generally does not control the total amount of powder dispensed. When an exact amount of powder is desired, a measuring tool is usually used. The measuring tool may be part of a set of measuring containers such as measuring spoons. To dispense the desired amount of powder, the powder is first poured into the measuring container.

As it may be appreciated from the description above, the process of dispensing a controlled amount of liquid or powder (herein after "matter") entails several drawbacks. First, the possibility of contaminating the surrounding area by the matter or contaminating the matter by the surrounding environment increases when two containers are used, one to store the matter and another to measure the amount of matter dispensed. Generally, transferring matter between containers is prone to accidents during the delivery such as spilling and spraying. The transfer of matter between two containers also increases the possibility of the matter being contaminated by dirt, dust, and other airborne contaminates. Second, there are often times when a measuring tool is not available so as to determine the exact amount of dispensed matter, during which the dispensing becomes guesswork. The measuring tool may be lost, damaged, or used by another party. Finally, because generally a single measuring tool is used to measure matter from a number of containers, the matter dispensed may be contaminated by matter that was previously measured by the same tool.

Prior efforts to provide integrated controlled dispensing for a container are disclosed in U.S. Pat. No. 3,917,129 to Cavazza (the '129 patent), and U.S. Pat. No. 5,123,574 to Povlos (the '574 patent). The '129 patent discloses a metering cap for a bottle that employs a metering chamber in the center of the cap. The cap meters the content of the metering chamber when the bottle is inverted. A second inversion empties the chamber. The cap of the '129 patent is limited in only providing the ability to measure a single quantity. Further, the cap of the '129 patent would not operate as effectively when powder is dispensed because the powder may require more than a single inversion to fill the chamber. The '574 patent discloses a dispenser that has a base with an opening that is controlled by a retaining tongue and a dispensing disk. The dispensing disk has an opening that is large enough to accommodate an opening in the base. A single shot such as a single pill may be dispensed by the dispenser. The dispenser of the '574 patent is limited in its ability to controllably dispense either liquid or powder.

SUMMARY OF THE INVENTION

In accordance with the present invention, there is presented a container top that allows for the controlled dispensing of a desired quantity of matter from the container without using a measuring tool. The container top includes a median portion that has one or more chambers, which have proximal openings and distal openings defining a proximal end (end nearest to the jar) and a distal end (end furthest from the jar) of the median portion. The top includes a cap with a surface defining a proximal opening, with at least one opening of the cap or median portion being movable relative to each other The opening in the cap helps select and control the flow of matter through the proximal openings of the chambers of the median portion. A distal disc is optionally interposed between the cap and the median portion to help seal that flow area and the relatively rotating portions. The top includes a second disc, rotatably coupled to the distal end of the median portion, the disc including at least one opening. The second disc controls the flow of matter through the distal openings of the chambers of the median portion.

In another embodiment, there is provided a method of extracting a predetermined amount of matter from a container. The container has a plurality of chambers that are arranged as a median element, a proximal control element, controlling a proximal end of the plurality of chambers, and a distal control element, controlling a distal end of the plurality of chambers. The method includes manipulating the median element to allow passage of matter through the proximal end of a chamber of the median element. The method then provides for inverting the container whereby matter flows into the chamber through the proximal end of the chamber. When the chamber is filled to capacity, the user manipulates the median element, while the container is substantially inverted, to prevent any further passage of matter into the chamber. Finally, the user manipulates the distal control element to allow passage of matter through the distal end of the chamber.

The container top thus includes rotatable elements that are used to dispense matter from the container. The top has a drum with chambers of varying volumes, and a rotatable disc on opposing ends of the drum to allow material to flow into and out of selected chambers of the drum. A spout is rotatably connected to one end of the drum with one disc connected to rotate with the spout, and a cap is rotatably connected to an opposing end of the drum. The drum and spout are rotated to control the filling of the chambers and the emptying of selected chambers. Latches extend between the parts to hold them together while allowing the rotation. Resilient rings are interposed between the drum and mating parts to allow resilient sealing of the chambers during rotation.

BRIEF DESCRIPTION OF THE DRAWINGS

The above and other advantages of this invention will be better understood by referring to the following description and drawings in which like numbers refer to like parts throughout, and in which:

FIGS. 1A–1G are illustrations of the elements of a container top for a powder container in accordance with the present invention, and in which:

DETAILED DESCRIPTION OF THE PREFERRED EMBODIMENT

The structure and operation of an embodiment of the present invention will now be described with reference to a powder container top (hereinafter "top") such as a spice jar. First, the structure of the top will be discussed with reference to drawings of a top. Second, the operation of the top when dispensing a controlled amount of powder will be discussed with reference to illustrations of a powder container that is fitted with the disclosed top.

Figure 1A:
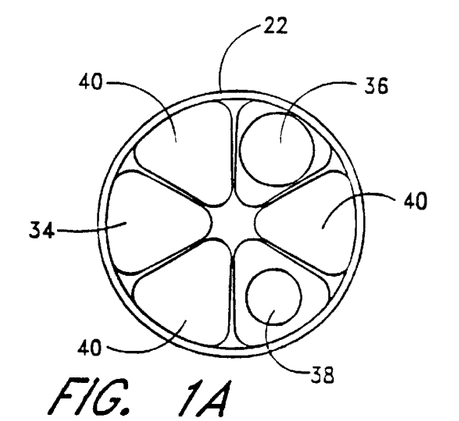
FIG. 1A is a top view of a rotatable drum and chambers of this invention.

FIGS. 1A–1D illustrate the structure of a top of the present invention that is especially useful for the controlled dispensing of powder, particularly spices from a spice jar, although it can be used with other flowable materials. FIG. 1A illustrates the a metering drum or median portion 22 of the top. The median portion 22 is shown as a cylindrical segment, but other shapes could be used. The median portion 22 has a plurality of chambers 34, 36, 38 arranged in a circular fashion along its inner circumference. In the illustrated embodiment, chamber 34 has a volume of 1 teaspoon, chamber 36 has a volume of ½ teaspoon, and chamber 38 has a volume of ¼ teaspoon. Other volumes could be used.

In the illustrated embodiment, the median portion contains six positions with three open chambers 34, 36, 38, and three blocked chambers 40. The three open chambers 34, 36, 38 include cavities of varying volumes. Each of the cavities 34, 36, 38 has a proximal opening on a first, proximal end of the median portion 22, so as to allow matter to enter the cavity. Each of the cavities 34, 36, 38 has a distal opening on a second, distal end of the median portion 22, so as to allow matter to exit the cavity. Preferably, but optionally, the median portion 22 includes a proximal control disc 23 that is coupled to the proximal end of the median portion to provide an improved seal between the cap 24 and the chambers of the median portion 22.

The disc 23 is also a pressure disc and a sealing disc, as it provides pressure to the periphery of the chambers 34, 36, 38 and it seals those chambers. The disc 23 as used in the illustrated embodiment is shown in FIG. 1G. The disc 23 has three openings 35 located on the disc 23 to correspond with the proximal openings to chambers 34, 36, 38. Depending on the number of chambers, differing numbers of openings 35 will be provided. The openings 35 can correspond to the openings in the proximal end of drum 22, as shown in FIG. 1G, or the openings 35 can have other shapes. The disc 23 is preferably made of a food compatible plastic having a low coefficient of friction and that provides good sealing capabilities when urged against the proximal end of drum 22. The disc 23 is sufficiently thick so that it can maintain a seal with the proximal end of the drum 22 across the entire diameter of the drum.

If the disc 23 is omitted, then the cap 24 provides a sealing surface directly against the proximal end of the metering drum 22. The presence of the intermediate disc 23 can help provide a better seal between the rotating parts (drum 22 and cap 24) around the openings to the chamber 34, 36, 38. But the disc 23 is believed to be optional.

Figure 1B:
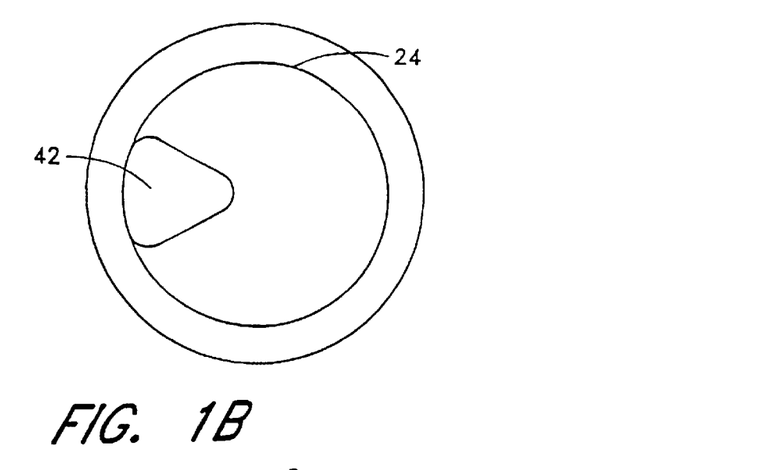
FIG. 1B is a plan view of a cap of this invention.
Figure 1C:
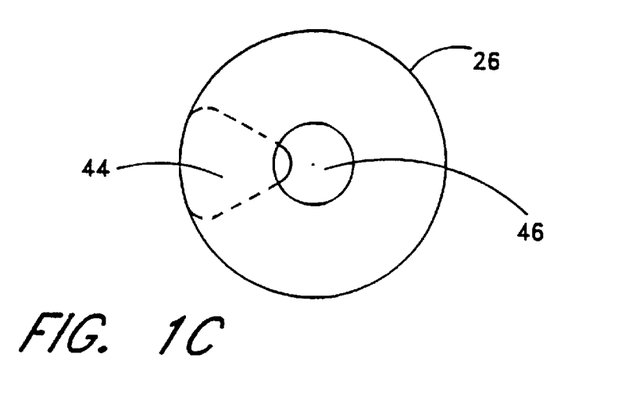
FIG. 1C is a top view of a spout of this invention.
Figure 1D:
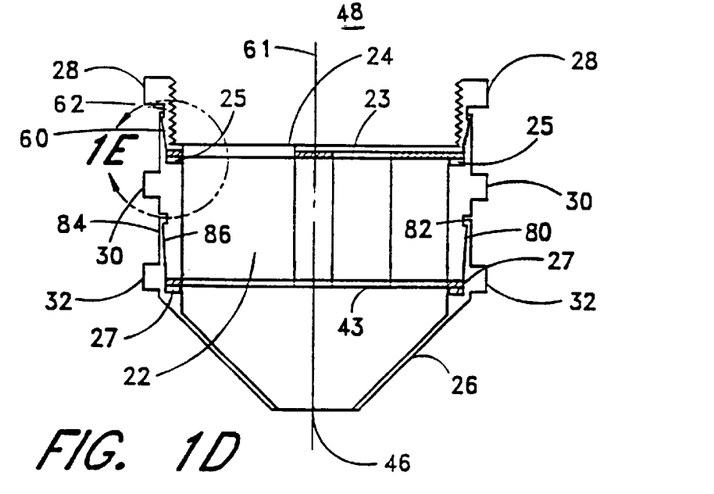
FIG. 1D is a sectional view along the centerline of this invention.

FIG. 1B is a top view of the cap of the jar cap 24 while FIG. 1D is a sectional view. The cap 24 has an opening 42 that is optionally, but preferably, in the shape of the associated chamber of the median portion 22. Various shapes can be selected for the opening 42 in the cap of the jar cap 24, such as a square opening, a circular opening, or a triangular opening, so long as the opening allows matter to flow into the associated chamber cavity of the median portion 22. The cap 24 is fixed in position relative to the jar, preferably by screwing the cap onto the jar using mating threads. A depending cylindrical flange with internal threads is provided for this connection, as shown in FIG. 1D. Raised surfaces 28, such as threads or other surfaces for interlocking engagement, can be provided on the cap 24 to make it easier to grip and turn the cap to tighten it. The cap 24 serves as a proximal control element because the opening in the cap 42 controls the flow of matter into the proximal opening of chambers of the median portion 22 as discussed below.

FIG. 1C is a top view of the distal control spout 26. In the illustrated embodiment, the distal control spout 26 is cone shaped. In alternative embodiments, the distal control spout 26 may be a flat disc, a cylinder, or a pyramid. The distal control spout 26 has a generally circular base portion. The base portion includes a distal control disc 43 that has an opening 44 that is generally in the shape of the largest chamber of the median portion 22. The opening 44 in the distal control disc 43 may be of any shape so long as it allows matter to freely flow from the chamber cavities of the median portion 22. The distal spout 26 has an upper opening 46 at its top portion. In an alternative embodiment, a single opening performs the function of both the opening 44 in the distal control disc 43 and the top opening 46. The disc 43 is of a similar material and construction as the disc 23, and provides a sealing surface to the distal end of drum 22 and the chambers therein.

In the illustrated embodiment, the distal control disc 43 is separate from the distal spout 26. The distal control disc 43 is preloaded against the median portion by a wavy washer, elastomer (rubber) ring or other spring preloading method. The distal control disc 43 is keyed to the distal control spout 26 with tabs in a slot or with pins, and is preferably fastened in the same way as disc 23 shown in FIG. 1E. The tabs can extend from the disc 43 into a mating recess in the distal control spout 26, or vice versa. At the proximal end the tabs or pins allow the proximal control disc 23 to rotate with the median portion 22 while bearing against the face of the cap 24. At the distal end the tabs or pins allow the distal control disc 43 to rotate with the distal control spout 26 while bearing against the face of the median portion 22. The preloading is desired so as to ensure that the chambers of the median portion 22 are sealed when not aligned with the proximal and distal openings.

FIG. 1D illustrates the arrangement of the jar cap 24, the median portion 22, the proximal control disc 23 the distal control disc 43, and the distal spout 26, in forming a top in accordance with the invention. The jar cap 24 is positioned concentrically with the median portion 22, on the proximal end of the median portion, such that the two elements share a center axis 61. The median portion 22 is pivotable around the shared center axis such that the opening in the jar cap 24 can align with a chamber of the median portion 22.

The distal control spout 26 is positioned concentrically with the median portion 22, on the distal end of the median portion. The distal control spout 26 rotates around the center axis 61 such that a chamber of the median portion 22 can align with the opening in the distal control disc 43 of the distal control spout 26. The median portion 22 rotates around the center axis 61 such that a chamber of the median portion 22 can align, by way of the proximal control disc 23, to the jar cap 24. The cap of the jar 24, the median portion 22, and the distal control spout 26, include protruding portions 28, 30, 32, respectively, which provide gripping surfaces to allow a user to easily and independently rotate each of the elements around the center axis. The opening 42 thus allows contents from the jar to enter various cavities such as 34, 36, 38 in the median portion 22, while the opening 44 allows the contents of the cavities to leave the median portion when the opening 44 is rotated to align with the selected cavity to be emptied.

Figures 1E, 1F:
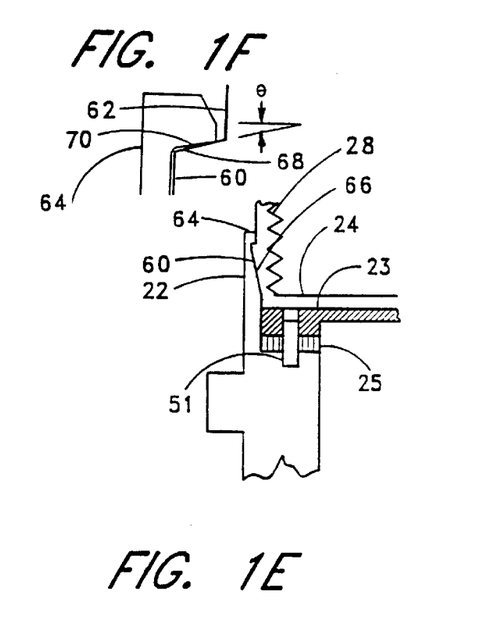
FIG. 1E is an enlarged view of portion 1E of FIG. 1D.
FIG. 1F is an enlarged view of a distal end of a latch engaging a ledge or recess in the drum.
Figure 1G:
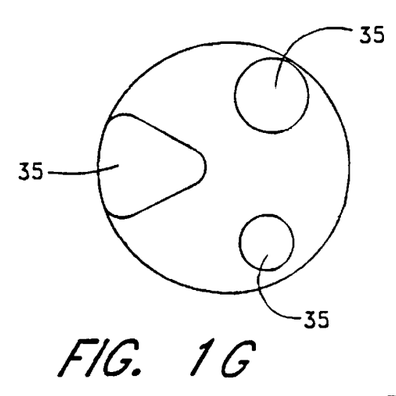
FIG. 1G is a plan view of a disc used in this invention.

Referring to FIGS. 1D and 1E, pre-load rings 25, 27 are provided adjacent to the proximal control disc 23 and the distal control disc 43, respectively. The rings are used to apply pressure to the proximal control disc 23 and distal control disc 43 so as to ensure that when the discs rotate, matter does not escape the chambers of the median portion 22. The ring 25 abuts an internal shoulder around the periphery of the metering drum so the ring 25 is restrained from moving along centerline 61 toward the distal end of the drum or median portion 22. The proximal end of the metering drum 22 abuts the distal end of the ring 25, and the proximal end of the proximal control disc 23 abuts the proximal end of the ring 25. The proximal disc 23 and proximal end cap 24 are urged against the resilient ring 25, to provide a resilient preload between the proximal end cap 24 and the proximal disc 23, as described further below.

The resilient ring 27 could be located on a shoulder on the distal end of the median portion 22 in an arrangement of parts that is the mirror image of resilient ring 25. But preferably the ring 27 is placed against an internal shoulder around the periphery of the spout 26. The distal control disc 43 is preferably fastened to the spout 26 so that the ring rotates with the spout. This fastening can be achieved by adhesives, threaded fasteners, tabs extending from the disc 43 into the barrel 22 or vice versa, pins fastening the ring to the spout 26, or by various other ways known to those skilled in the art. It could be achieved by shaping the ring to conform to the shape of the housing, as by having projections on the housing that extend into the otherwise circular shape of the ring, and shaping the ring to conform to the non-circular shape so that rotation of the ring relative to the spout 26 is prevented. Similar fastening mechanisms can be used with the disc 23 and barrel 22.

The metering drum or median drum 22 thus has the discs 23, 43 on opposing ends, with resilient rings 25, 27 providing a resilient force urging the discs 23, 43 against the ends of metering drum 22 to seal the chambers 34, 36, 38. The resilient rings 25, 27 can be located at various places relative to the discs 23, 43, and the opposing ends of the drum 22 and still achieve a suitable seal between the relative rotating parts.

FIG. 1E illustrates a preferred method of connecting and preloading the discs 23, 43 to a chamber element. FIG. 1E illustrates a connection of the proximal control disc 23 to the proximal end of the median portion 22. The method illustrated in FIG. 1E is equally applicable to preloading the distal control disc 43 against the median portion 22. A stainless steel pin 51 is used to connect the median portion 22 to the proximal control disc 23. The pin 51 passes through preload ring 25 thereby keying rotation of the median portion 22 with the proximal control disc 23. The pin 51 allows for a secure preloaded connection between the proximal control disc 23 and the median portion 22 so as to prevent liquid, for example, from escaping a chamber of the median portion. The preload ring 25 is preferably made of rubber or a suitable elastomeric material. The proximal control disc 23 is preferably made of plastic with a low coefficient of friction.

Figure 2A:
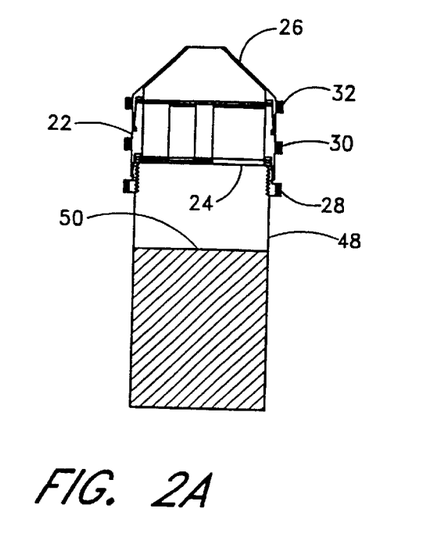
FIGS. 2A–2D illustrate the process of using the container top of FIGS. 1A–1G to dispense a controlled amount of material.

FIGS. 2A–2D illustrate the operation of the top of FIG. 1D. FIG. 2A illustrates the top as fitted onto a container, such as a spice jar 48. The jar 48 contains powder matter 50. In the illustrations of FIGS. 2A–2D, the protrusions 28, 30, and 32 on the edges of the cap 24 of the jar, median portion 22, and distal spout 26, respectively, may optionally be color coded to indicate the orientation of the respective element. The color-coding is not required as part of the invention. The median portion has six positions (3 blank). The distal spout has six positions (5 blank). Also, detents could be provided to align the rotating element 24 with the entrance openings to each chamber, e.g., openings 34, 36, 38, or to align the opening 44 with the exit openings of each chamber. Detents are well known, and not described in detail other than to say they generally comprise a recess into which a locking member or ball is resiliently urged, with the recess or distal tip of the locking member or ball being curved or inclined to make it easy to disengage the member or ball from the recess.

Figure 2B:
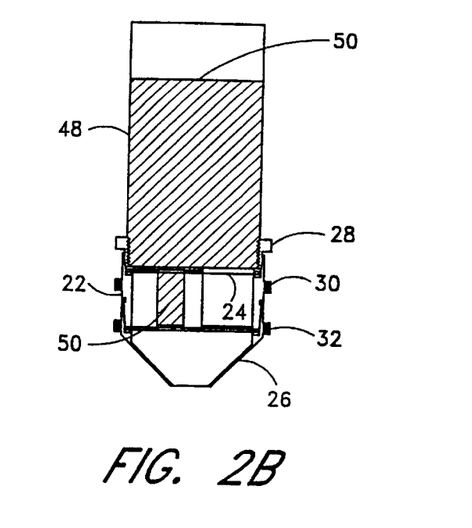
Figure 2C:
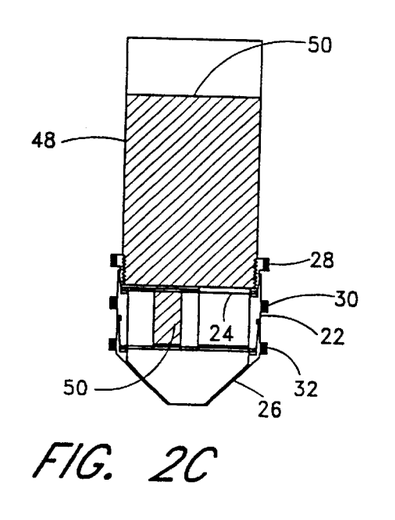
Figure 2D:
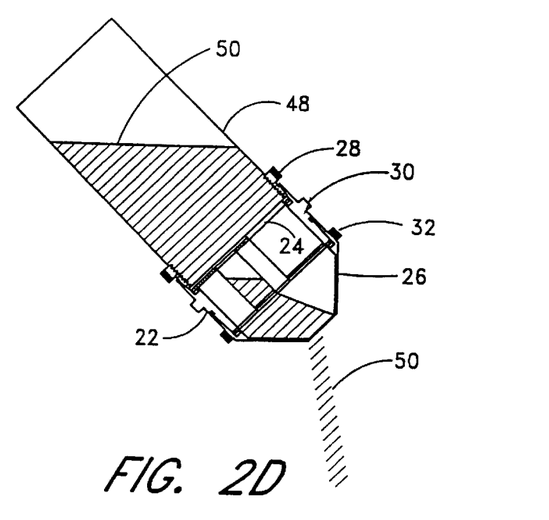

The first step in dispensing a controlled amount of powder 50 from the jar 48 is to rotate the median portion 22 to the desired position while the jar is upright. Rotation of the median portion 22 aligns the selected proximal control disc 23 opening to the opening in the cap 24 of the jar. As discussed above, each cavity is of a predefined volume, so as to provide a range of dispensing quantities. To fill a cavity of the median portion, the powder flows into the cavity by inverting the jar, as is illustrated by FIG. 2B. The powder 50 flows into the cavity because the proximal end of the cavity is open. The powder 50 remains in the cavity because the distal end of the cavity is blocked by the distal control disc 43 of the distal spout 26. Once the cavity is filled with powder 50, the median portion 22 is rotated back to a blank space position. The proximal control disc 23, at the blank space position, prevents the flow of powder 50 into, or out of, the cavity that was previously filled.

At this time, there is a known amount of powder 50 in the cavity because the volume of the cavity is known. As mentioned earlier, the volume of various cavities can differ in predetermined ways to dispense differing amounts of material. To dispense the powder 50 from the cavity, the distal spout 26 is rotated to the opened position such that the opening in the distal control disc 43 is aligned with the filled cavity in the median portion 22. Once the cavity is aligned with the opening in the distal control disc 43 the powder 50 is allowed to flow from the cavity when the jar is turned so that gravity causes the material to exit the cavity. The spout 26 is optionally provided so that the powder 50 always exits at the same location regardless of where the chamber containing the powder is located around the periphery of the median portion 22.

Although the operation of the top was described with reference to rotations of the median portion 22 along with its proximal control disc 23, and the distal control disc 43 in the distal spout 26, other combinations of rotations can lead to the same result.

The disclosed top also allows for sprinkling powder or pouring powder from the jar. With the jar 48 in an upright position, the distal spout 26 could be rotated to align the opening in the distal control disc 43 with any one of the cavities in the median portion 22. The median portion 22 is rotated to align the openings in the proximal control disc 23 with the opening in the cap 24. By tilting the jar 48, the desired amount of powder could be manually dispensed.

The median portion 22 in combination with the disc 23 and disc 43 effectively provides a metering drum for measuring and holding various volumes of the material in jar 48, and metering it out through cooperation with the various parts of the top through spout 26. The chambers are of various volumes to allow retention and dispensing of differing amounts of material. One or more openings 35 in the proximal disk 23 and the metering drum 22 are relatively rotated to fill various chambers 34, 36, 38 in the drum 22, and further rotated to prevent the flow of the material from the filled chambers back into the jar. The distal disc 43 and metering drum 22 are relatively rotated to contain material in the various chambers 34, 36, 38 until such time as the opening 44 is aligned with a selected chamber to allow the contents of the selected chamber to be emptied.

Because the discs 23, 43 rotate, there is a tendency of material in the cavities of the metering drum to escape between the walls defining the cavities and the discs 23, 43. It is thus desirable to have a fit between the discs 23, 43 and the movable mating surfaces sufficiently tight to restrain leakage from the chambers to an acceptable level, but not so tight as to unduly inhibit relative rotation of the discs 23, 43.

The present invention also provides a snap lock assembly that can be configured to provide a sufficiently tight seal among the relative moving surfaces to prevent spices or other contents of the chambers from leaking out of the various filled chambers, e.g., chambers 34, 36, 38. Referring to FIGS. 1D, 1E and 1F, two sets of mating inclined surfaces provide a snap-lock engagement of a flange with a recess in order to hold various parts together. The described snap-lock engagement advantageously comprises a continuous engagement around the periphery of the top, but discrete, segmented locking portions could also be used.

In particular, cap 24 has a distal end adjacent the median portion 22, which distal end has a truncated conical surface 60, or frusto-concial surface 60. The smaller diameter of the surface 60 is at the distal end of the cap 24, adjacent to the median or drum portion 22. The larger diameter of the tapered, conical surface 60 is at the proximal end that engages the jar 48 (FIG. 2). The angle of inclination of the surface 60 with respect to a cylindrical surface concentric with the longitudinal axis 61 (FIG. 1D) of the jar 48, is about 15°–30° to allow the flange 64 to ramp along surface 60.

At the larger end of the tapered surface 60 is a recess 62 which engages an inward extending flange 64 on the median portion. The flange 64 is located at the end of a tapered, or frusto-conical surface 60 on the median portion 22 located to abut the inclined surface 60. The inclination of the surface 66 relative to the centerline 61 of the container is preferably the same as that of inclined surface 66, but in the opposite direction so that the inclined surfaces 60, 66 can ramp over each other as the median portion 22 moves along the centerline toward or away from cap 24.

As the median portion 22 moves along the centerline 61, the flange 64 will be forced radially inward or outward relative to the centerline as the inclined surfaces 60, 66 ramp over each other. Thus, by pushing the median portion 22 toward the jar 48 along the centerline 61, the flange 64 is forced radially outward so it can pass over the end of the ramped surface 60 on the cap, and enter the recess 62 in the cap. This provides a resilient, snap-lock fit. Advantageously, the flange 64 extends continuously around the circumference of the median portion 22, but segmented, or periodic flanges could be used.

As the flange 64 is moved along the inclined surface 60, the median portion 22 compresses the preload ring 25 and the proximal control disc 23 between the cap 24 and the median portion 22. The preload ring 25 is a gasket of resilient material that can compress slightly in order to maintain a suitably tight fit between the median control disk 23 and the cap 24 while still allowing the disk 23 to rotate relative to cap 24. The tightness of the fit is sufficient to reduce leakage of spices etc. out of the chambers through the moving surfaces 23, 24. The pin 51 fastens the resilient preload ring 25 to the median control disk. This resilient snap-lock seal thus provides a way to form a suitable, resilient seal between the moving parts 23, 24 to prevent leakage from chambers 34, 36, 38. The flanges 64 are resiliently urged inward toward centerline 61 so the flanges provide a resilient, spring-loaded engagement with the mating ledges 68. This not only provides an easily assembled top, but provides a resilient force to seal the chambers in the metering drum 22, as described in more detail below.

As best seen in enlarged view of FIG. 1F, the recess 62 is formed by an inclined wall or lip 68. The lip 68 is not orthogonal to the longitudinal axis 61 of the container, the axis about which the cap 24 rotates as it engages the jar or container 48. Instead, with respect to a plane orthogonal to the longitudinal axis 61, the lip 68 inclines toward the median portion 22 at an angle θ. The angle of inclination θ advantageously about 10–20°, and preferably about 15°.

The abutting surface 70 on the flange 64 that engages lip 68 is also slightly inclined so that it is not in a plane orthogonal to the longitudinal axis 61. The surface 70 could have a corresponding inclination as the abutting lip 68 so they ramp over each other in complete abutment. But advantageously, the relative inclinations are slightly different. Preferably, the inclination angle of surface 70 being smaller than the inclination angle of lip 68. The angle of inclination of surface 70 relative to this orthogonal plane is advantageously about 5–12°, and preferably about 9°. Desirably, the difference in the angles of inclination on the lip 68 and the surface 70 is about 5°. The relative inclinations of lip 68 and abutting surface 70 allow some movement of the abutting surfaces, which in turn allows some movement of the cap 24 relative to the median portion 22 along axis 61. That axial play or movement allows rotation of the median portion 22 relative to the stationary cap 24 while still providing a suitable seal to chambers 34, 36, 38.

Referring to FIG. 1D, a similar inclined snap-lock seal is provided between the distal end of the median portion 22 and the spout 26. Thus, the distal end of the median portion 22 that is adjacent to the spout 26 has a truncated conical surface 80, or frusto-concial surface 80. The smaller diameter of the surface 80 is toward the spout 26. The larger diameter of the tapered, conical surface 80 is at the distal end of the median or drum portion 22 that engages the spout 26. At the larger end of the tapered surface 80 is a recess 82 which engages an inward extending flange 84 on the spout 26.

The flange 84 is located at the end of a tapered, or frusto-conical surface 86 on the spout 26 which surface is located to abut the inclined surface 80. The inclination of the surface 80 relative to the centerline 61 of the container is preferably the same as that of inclined surface 80, but in the opposite direction so that the inclined surfaces 80, 86 can ramp over each other as the median portion 22 moves along the centerline toward or away from spout 26.

As the spout 26 moves along the centerline 61 toward median portion 22, the flange 84 on the spout 26 will be forced radially inward or outward relative to the centerline as the inclined surfaces 80, 86 ramp over each other. Thus, by pushing the spout 26 toward the jar 48 along the centerline 61, the flange 84 is forced radially outward so it can pass over the end of the ramped surface 80 on the median portion 22, and enter the recess 82 in the median portion. This provides a resilient, snap-lock fit. Advantageously, the flange 84 extends continuously around the circumference of the spout 26, but segmented, or periodic flanges could be used.

As the flange 84 is moved along the inclined surface 80, the spout 26 compresses the preload ring 27 and the distal control disc 43 located between the median portion 22 and the spout 26. The preload ring 27 is a gasket of resilient material that can compress slightly in order to maintain a suitably tight fit between the distal control disk 43 and the spout 26 while still allowing the disk 43 to rotate relative to median portion 22. The tightness of the fit is sufficient to reduce leakage of spices etc. out of the chambers 34, 36, 38 through the moving surface 43. The pins 51 fastens the resilient preload ring 27 to the spout 26. This resilient snap-lock seal thus provides a way to form a suitable preload seal between the rotating discs 23, 43 and the drum 22 to help prevent leakage from chamber 34, 36, 38.

The details of the flange 84 and the recess 82 are the same as flange 64 and recess 62, and are not repeated. It should be noted, however, that the proximal end of the metering drum preferably has an exterior surface that tapers toward the distal at an angle of about 15° to 30° relative to a cylindrical surface coincident with the axis 61, to provide a ramping and locking action for the flange 84 engaging recess 82.

There is thus advantageously provided a dispenser cap that provides a resilient seal that maintains the contents of the dispensed product within rotating compartments, while providing a snap-lock assembly that is easy to make and assemble. Movement along the tapered portions 60, 80 provide a ramping action that urges the flanges 64, 84 into mating recesses 62, 82 in order to provide a resilient axial compression to resilient rings 25, 27. That provides a resilient axial seal to the moving surfaces that enclose the chambers 34, 36, 38.

In an alternative embodiment, the dispensing of powder could be accomplished by inverting the jar and employing one continuous rotation of the distal spout 26 such that the distal spout is detented to the median portion 22 causing it to rotate to the desired aligned position with respect to the cap 24 of the jar, thereby filling the desired cavity. Further rotation of the distal spout 26 releases the distal spout 26 from the detent position with respect to the median portion 26, thereby aligning the opening in the distal control disc 43 with the desired filled chamber releasing the powder.

In still another embodiment, the discs 23, 43 could be made of plastic materials bonded to the proximal end of median portion 22 and the proximal end of the distal spout 26. The median portion 26 could be made from relatively stiff elastomeric material to provide the preload at the interfaces between the elements.

In another embodiment the chambers are equal in volume and are contained within the cap or jar. The device operates as described herein, or by rotating the distal control discs 23, 43, or other combination of rotations, to dispense a fixed amount of matter from each chamber. The rotational force could be manually provided or provided by a prime mover such as a motor/gear box or a water driven wheel with a gear box.

This cap can accurately measure various volumes, such as ¼, ½ and 1 teaspoon amounts of condiment by use of the metering drum, and the use of the selector discs to fill and empty the various chambers in the drum 22. The basic parts of the container top comprise the cap 24, the metering drum 22, a selector, such as the spout 26 and associated disc 43.

The top has a new and useful way to preload the interface between the jar cap 24 and the metering drum 22, and to preload the interface between the metering drum and the selector. This preloaded interface helps reduce leakage of material, such as condiments, from the rotating interfaces by providing a shearing action to divide the condiment when the parts of the top are rotated with respect to each other. The preloaded interface can also be used to accommodate the measurement of liquids because the rotating interfaces have no end play between them.

The top also has the ability to positively cut off flow of material after the selected metering drum cavity is filled. This feature is accomplished by providing blank spaces or blocked chambers 40 between each fillable chamber 34, 36, 38 of the metering drum 22. A detent position associated with each chamber 34, 36, 38, and a detent position associated with each intervening blank chamber 40, allows the user to rotate the metering drum 22 to the position selected to dispense material, fill the selected chamber 34, 36, 38, and then by clicking to the next detent position, move in either direction to positively seal the cavity to hold the condiment within the selected cavity.

Preferably the jar cap 24 has a single opening 42, with the cap being connected to the container. Threaded connections are common, but other connections can be used, including snap-on connections. The metering drum 22 preferably has six detent positions with three alternating cavities 34, 36, 38 and three alternating blank positions 40. The metering drum 22 is attached to a snap-lock mechanism to the cap 24. A selector assembly comprising the spout 26 and disc 43 are also connected to the metering drum 22 by a similar snap-lock mechanism.

The snap-lock mechanism the snap action of the flanges 64 engaging the ledge or recess 62 provides an interface pressure to the mating interfaces between the jar cap 24 and the metering drum 22. The snap action locking is provided by the resiliency of the latching members formed by conical skirt 60 extending from the drum 22 to the flanges 64 that extend radially inward. The conical skirt 60 is shown as continuous, but it could be segmented, or it could comprise one, or a plurality of, discrete latching members with the flanges 64 on the distal ends of the latching members.

The axial preloading is provided by the inclined engaging surfaces, one on the flange 64 and one on the recess 62. These surfaces 68, 70 are preferably slightly inclined relative to each other so that when the flange 64 is resiliently urged radially inward by skirt 60, the flange 64 moves axially away from the cap 24, causing the ring 25 to compress and causing the cap 24 and disc 23 to resiliently and sealingly engage. A similar latching and resilient engagement is achieved on the opposing end of the drum 22, via the notch 82 and flange 84 on the ends of the spout 26, which resiliently urge the disc 43 against the ring 27.

When a selected one of the chambers 34, 36, 38 is filled with material by inverting the container, then the disc 24 can be rotated by gripping areas 30 on drum 22. The disc 24 rotates with the drum to slidingly place a blocked chamber 40 over the opening to the now-filled chamber that was selected. The use of detents on each chamber allow the user to easily identify and locate the blocked chambers to entrap the material in the selected chamber. The material in the selected chamber 34, 36, 38 is trapped in the chamber by the interface pressure achieved by the resilient rings 25, 27 and the parts that compress those rings. This interface pressure allows the cap 24 and discs 23, 43 to be urged toward the drum 22 sufficiently to seal the chambers. The material is released from the selected chamber by rotating spout 26, which rotates distal disc 43 to open the selected chamber. Rotating the spout to align the opening 44 with the detent corresponding to the selected chamber makes alignment easy.

In the above embodiments the latches extend from a distal element toward a proximal element to resiliently couple the elements together. Given the present disclosure, one skilled in the art could use the same latching design and have the latches extend from a proximal element toward a distal element to resiliently connect the cap 24 to the drum 22, or to connect the drum 22 to the spout 26.

There is thus advantageously provided a cap 24 having a proximal end connected to the container 48 and a surface covering an opening of the container. The cap surface 24 has an opening 42 therein through which material 50 from the container can flow. A drum is also provided that has a proximal end and a distal end. The drum contains a plurality of chambers 34, 36, 38, each opening onto both the proximal and distal ends, with at least two of the chambers being of different predetermined volumes. There is also provided a drum latching portion 60 extending between the drum 22 and cap 24, generally parallel to the longitudinal axis. The latching portion has a distal end engaging a recess 62 in one of the drum 22 or cap 24 so as to restrain lateral and axial movement of the drum relative to the cap but allow relative rotation of the drum and cap about the longitudinal axis 61. The relative rotation aligns the opening 42 in the cap 24 with at least some of the proximal openings 34, 36, 38 of the drum to allow material 50 to flow from the container 48 in to the drum 22.

Spout 26 also covers the distal end of the drum 22, and defines an inlet 44 through which material 20 can pass from the drum into the spout. The spout has an outlet 46 in fluid communication with the inlet so that matter 50 can pass from the inlet to the outlet. A spout latching portion extends between the drum 22 and spout 26 generally parallel to the longitudinal axis 62. The spout latching portion has a distal end 84 engaging a recess 82 one of the drum 22 or spout 26 so as to restrain lateral and axial movement of the spout relative to the drum but allow relative rotation of the drum and spout about the longitudinal axis. The relative rotation aligns the spout inlet 44 with at least some of the distal openings 34, 36, 38 of the drum 22 to allow material to flow from the drum into and out of the spout 26.

Advantageously at least one of the latching portions comprise a tubular flange 64,84 generally coaxial with the longitudinal axis with the distal end comprising a flange extending radially inward toward the axis 61. The latching portion is preferably smaller than whatever surface defines the recess 62, 82 so the flange 64, 84 is resiliently urged toward the longitudinal axis as the flange engages the recess. Per FIG. 1F, the flange 64 (84) preferably has an inclined surface 70 relative to a plane orthogonal to the longitudinal axis 61, and the recess 62 (82) has a similarly inclined surface 68 so that movement of the flange toward or away from the longitudinal axis causes axial motion of the parts held by the latch.

The above description is given by way of example, and not limitation. Given the above disclosure, one skilled in the art could devise variations that are within the scope and spirit of the invention, including various ways of arranging and connecting together the control discs of the top. Further, the various features of this invention can be used alone, or in varying combinations with each other and are not intended to be limited to the specific combination described herein. Thus, the invention is not to be limited by the illustrated embodiment but is to be defined by the following claims when read in the broadest manner to preserve the validity of the claims.

What is claimed is:

1. A container top for dispensing variable amounts of a material from a container having an opening over which the top is fastened during use, the container top comprising:

a cap having a flange sized to fit over the opening to the container and having at least one cap opening therein located to rotatably align with the proximal opening of at least one chamber to control the flow of material through the cap opening during use, the cap having a recess on an exterior surface of the cap;

a metering drum portion having a distal end and a proximal end with at least one chamber having a distal opening in the distal end of the chamber, and having a proximal opening in the proximal end, the at least one chamber being located to align with at least one opening in the cap to allow material to flow through the cap into the chamber during use, the drum and cap being rotatably mounted relative to each other, the drum having a latch having a distal end located to resiliently engage the recess in the cap to hold the drum to the cap, the recess extending around at least a portion of a periphery of the cap to allow the distal end of the latch to slide around the periphery of the cap within the recess as the cap and drum rotate relative to each other;

a spout having a distal and proximal end with the proximal end rotatably coupled to the metering drum and the distal end having an opening therein; and a distal disc coupled to the proximal end of spout to rotate with the spout, the distal disc having an opening therein located to rotatably align with the distal opening of the at least one chamber to control the flow of matter from the chamber through the distal opening, the opening in the distal disc being in fluid communication with the opening in the distal end of the spout to allow material to flow from through the distal disc out the opening in the distal end of the spout.

2. A container top of claim 1, further comprising:

at least one latch on the spout having a distal latch end located and sized to resiliently engage a recess in the drum to resiliently urge the spout against the drum, the recess in the drum extending around at least a portion of the periphery of the drum so the spout's latch can slide in the drum's recess as the drum and spout rotate relative to each other.

3. The container top of claim 2, wherein the latch on the spout further comprises an inclined surface on at least one of the distal end of the spout's latch and a surface forming the recess in the drum so that a radially inward force on the latch urges the spout and metering drum toward each other.

4. The container top of claim 2, wherein the metering drum comprises a plurality of chambers of varying volumes to allow the dispensing of different amounts of matter.

5. The container top of claim 2, wherein the latches on the spout and drum further comprise a resilient member extending generally parallel to a longitudinal axis about which the drum rotates and resiliently urging the distal ends of the latches into the mating recess to form a snap-lock connection between the parts held together by the respective latches.

6. The container top of claim 2, wherein at least one of the latches comprises a tubular portion concentric with a longitudinal axis about which the metering drum rotates and having an inclined surface which abuts a mating inclined surface on the recess to provide a resilient force along the longitudinal axis.

7. The container top of claim 2, wherein the distal disc is rotated with the spout by pins extending between the distal disc and the spout.

8. The container top of claim 2 wherein the top is adapted to be fitted and used with a spice container.

9. The container top of claim 1, further comprising:
a first resilient ring interposed between the proximal end of the drum and the cap; and
a proximal disc interposed between the first ring and the cap, the proximal disc having openings corresponding in location to at least some of the openings in the proximal ends of the chambers, the proximal disc helping to provide a seal between the cap and the openings in the drum.

10. The container top of claim 9, further comprising a second resilient ring interposed between the spout and the distal disc and held in compression by the second disc during use and located to allow resilient movement between the second disc and the distal end of the metering drum.

11. The container top of claim 9, wherein the latch on the drum further comprises an inclined surface on at least one of the distal end of the drum's latch and a surface forming the recess in the cap so that a radially inward force on the latch resiliently urges the cap and metering drum toward each other.

12. The container top of claim 11, wherein the latch on the spout comprises an inclined surface on at least one of the distal end of the spout's latch and a surface forming the recess in the drum so that a radially inward force on the latch urges the spout and metering drum toward each other.

13. The container top of claim 1, wherein the latch on the drum further comprises an inclined surface on at least one of the distal end of the drum's latch and a surface forming the recess in the cap so that a radially inward force on the latch resiliently urges the cap and metering drum toward each other.

14. The container top of claim 1, wherein the metering drum comprises a plurality of chambers of varying volumes to allow the dispensing of different amounts of matter.

15. The container top of claim 1 wherein the metering drum comprises chambers that are sealed on both the proximal end and the distal end of the chamber interspersed with chambers having open ends at the proximal and distal ends of the chamber.

16. The container top of claim 1, wherein the recess extends around the entire circumference.

17. A method of dispensing a predetermined amount of matter from a container, the container having a plurality of chambers of different volume in a median element, a proximal control element controlling access to a proximal end of the plurality of chambers, and a distal control element controlling access to a distal end of the plurality of chambers, the method comprising:
rotating the median element to allow passage of matter through the proximal end of a selected one of the plurality of chambers of the median element;
orienting the container so that matter flows into said selected chamber through the proximal end of the selected chamber;
rotating the median element while the container is orientated to maintain matter within the selected chamber to prevent passage of matter from said chamber;
rotating the distal control element to allow passage of matter through the distal end of said chamber; and
resiliently urging the proximal and distal control elements against compressible rings interposed between the median element and each of the proximal and distal control element in order to provide an improved sealing force to restrict unintentional loss of material from the selected chamber.

18. The method of claim 17, further comprising resiliently latching the proximal control element to the median element, and resiliently latching the distal control element to the median control element.

19. A container and top for selectively dispensing matter from within the container by rotating parts of the top about a longitudinal axis of the top and container, the container and top comprising:
a cap having a proximal end connected to the container and a surface covering an opening of the container, the surface having an opening therein through which material from the container can flow;
a drum having a proximal end and a distal end and containing a plurality of chambers each opening onto both the proximal and distal ends, at least two of the chambers being of different predetermined volumes;
a drum latching portion extending between the drum and cap parallel to the longitudinal axis, the latching portion having a distal end engaging a recess in one of the drum or cap so as to restrain lateral and axial movement of the drum relative to the cap but allow relative rotation of the drum and cap about the longitudinal axis, the relative rotation aligning the opening in the cap with at least some of the proximal openings of the drum to allow material to flow from the container in to the drum;
a spout covering the distal end of the drum and defining an inlet through which material can pass from the drum into the spout, the spout having an outlet in fluid communication with the inlet so that matter can pass from the inlet to the outlet;
a spout latching portion extending between the drum and spout parallel to the longitudinal axis, the spout latching portion having a distal end engaging a recess in one of the drum or spout so as to restrain lateral and axial movement of the spout relative to the drum but allow relative rotation of the drum and spout about the longitudinal axis, the relative rotation aligning the spout inlet with at least some of the distal openings of the drum to allow material to flow from the drum through the spout.

20. The container and top of claim 19, wherein at least one of the latching portions comprise a tubular flange generally coaxial with the longitudinal axis with the distal end comprising a flange extending radially inward toward the axis, the latching portion smaller than whatever surface defines the recess so the flange is resiliently urged toward the longitudinal axis as the flange engages the recess.

21. The container top of claim 20, wherein the flange has an inclined surface relative to a plane orthogonal to the longitudinal axis, and the recess has a similarly inclined surface so that movement of the flange toward or away from the longitudinal axial motion of the parts held by the latch.

22. The container top of claim 20, wherein the surfaces are inclined relative to the plane orthogonal to the longitudinal axis at an angle of about 5–12°.

23. The container top of claim 19, further comprising a proximal sealing disc and a resilient ring interposed between the cap and the drum, the proximal disc being resiliently urged against the ring by the drum latching portion, the proximal sealing disc having a plurality of openings corresponding in location to the openings in the distal ends of the drum to allow material to flow from the container into the drum, the proximal disc being constrained to rotate with the drum.

* * * * *